United States Patent
Feller et al.

(10) Patent No.: US 10,163,006 B2
(45) Date of Patent: Dec. 25, 2018

(54) SELECTION DETERMINATION FOR FREEHAND MARKS

(71) Applicant: INTERNATIONAL BUSINESS MACHINES CORPORATION, Armonk, NY (US)

(72) Inventors: John A. Feller, Cary, NC (US); Ryan E. Soley, Upper Darby, PA (US); Christopher K. Waldon, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/443,439

(22) Filed: Feb. 27, 2017

(65) Prior Publication Data

US 2018/0247118 A1    Aug. 30, 2018

(51) Int. Cl.
*G06K 9/34* (2006.01)
*G06K 9/00* (2006.01)
*G06K 9/18* (2006.01)
*G06K 9/46* (2006.01)
*G06K 9/52* (2006.01)

(52) U.S. Cl.
CPC ..... *G06K 9/00463* (2013.01); *G06K 9/00483* (2013.01); *G06K 9/18* (2013.01); *G06K 9/4638* (2013.01); *G06K 9/52* (2013.01); *G06K 2209/01* (2013.01); *G06K 2209/503* (2013.01)

(58) Field of Classification Search
CPC .... G06F 3/04883; G06F 3/0481; G06F 17/21; G06F 17/24
USPC ....... 382/175, 182, 209, 218, 224, 228, 229, 382/278; 358/401, 403, 405, 448
See application file for complete search history.

(56) References Cited

U.S. PATENT DOCUMENTS

| | | | |
|---|---|---|---|
| 5,229,589 A | 7/1993 | Schneider | |
| 6,429,856 B1* | 8/2002 | Omura | G06F 3/0416 178/18.09 |
| 6,579,099 B1* | 6/2003 | Pipes, Jr. | G09B 11/04 33/1 K |
| 6,792,398 B1* | 9/2004 | Handley | G06F 3/016 345/419 |
| 7,228,302 B2* | 6/2007 | Kuchinsky | G06F 17/2775 |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Yosef Kassa
(74) *Attorney, Agent, or Firm* — Brian Restauro; Hye Jin Lucy Song; Heslin Rothenberg Farley & Mesiti PC (57) ABSTRACT

Methods, computer program products, and systems are presented. The methods include, for instance: obtaining an unmarked questionnaire form and creating form metrics data of the unmarked questionnaire form, receiving a selection marked form having freehand marks and determining selections data by quantifying a center point of a freehand mark and by comparing the center point with the form metrics data. Selections data may be adjusted according to positional consistency amongst the freehand marks if one mark is ambiguous as to the distances to answer choices.

20 Claims, 6 Drawing Sheets

(56) References Cited

U.S. PATENT DOCUMENTS

| | | | | |
|---|---|---|---|---|
| 7,305,611 | B2* | 12/2007 | Coppin | G06F 17/21 345/419 |
| 8,054,971 | B2* | 11/2011 | Weiner | H04M 1/72552 380/229 |
| 8,257,086 | B1* | 9/2012 | Di Carlo | G09B 11/04 434/162 |
| 8,416,466 | B2 | 4/2013 | Takata | |
| 8,438,489 | B2* | 5/2013 | Barthelmess | G06F 17/242 345/179 |
| 8,600,165 | B2 | 12/2013 | Saubat et al. | |
| 8,762,856 | B2* | 6/2014 | Nykamp | G06F 17/2211 715/738 |
| 8,792,141 | B2 | 7/2014 | Moore et al. | |
| 2006/0127872 | A1 | 6/2006 | Marggraff | |
| 2014/0247965 | A1 | 9/2014 | Van Wesep et al. | |
| 2015/0154879 | A1 | 6/2015 | Poor et al. | |

OTHER PUBLICATIONS

"Implementing the OCR/A check box recognition method", [retrieved on Nov. 10, 2016]. Retrieved from the Internet: <URL: http://www.ibm.com/support/knowledgecenter/SSZRWV_9.0.1/com.ibm.dc.develop.doc/dcdev383.htm >, IBM Knowledge Center, 1 pg.

* cited by examiner

FIG. 6

SELECTION DETERMINATION FOR FREEHAND MARKS

TECHNICAL FIELD

The present disclosure relates to data extraction from freehand marks on a questionnaire form, and more particularly to methods, computer program products, and systems for determining selections intended by the freehand marks by analyzing positions of critical points in the questionnaire form and the freehand marks.

BACKGROUND

In surveys not originally designed for digital scanning, the questionnaire forms may be casually designed for manual data collection. In case the surveys evolve into more massive data that would be more efficiently handled by digital processing, the freehand marks on the questionnaire forms by which respondents had indicated the choices need to be first converted into digital data. Such conversion of manual paperwork into digital data would typically require significant human effort in reading the marked forms and inputting the data recognized as answers.

SUMMARY

The shortcomings of the prior art are overcome, and additional advantages are provided, through the provision, in one aspect, of a method. The method for automatically determining selections data from a selection marked form includes, for example: obtaining, by one or more processor from an input device, an unmarked questionnaire form, wherein the unmarked questionnaire form is identical to the selection marked form without freehand marks; creating form metrics data of the unmarked questionnaire form, wherein the unmarked questionnaire form includes one or more question and two or more answer choices for respective question of the one or more question; receiving the selection marked form as an input, wherein the freehand marks had been manually written on the selection marked form by a respondent answering the respective question in the unmarked questionnaire form; determining the selections data based on the freehand marks on the selection marked form, wherein the selections data represents respective selection amongst the two or more answer choices for the respective question; adjusting the determined selections data for one or more ambiguous mark according to a pattern of the freehand marks; and producing the adjusted selections data such that the selections data may be utilized for a statistical analysis.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
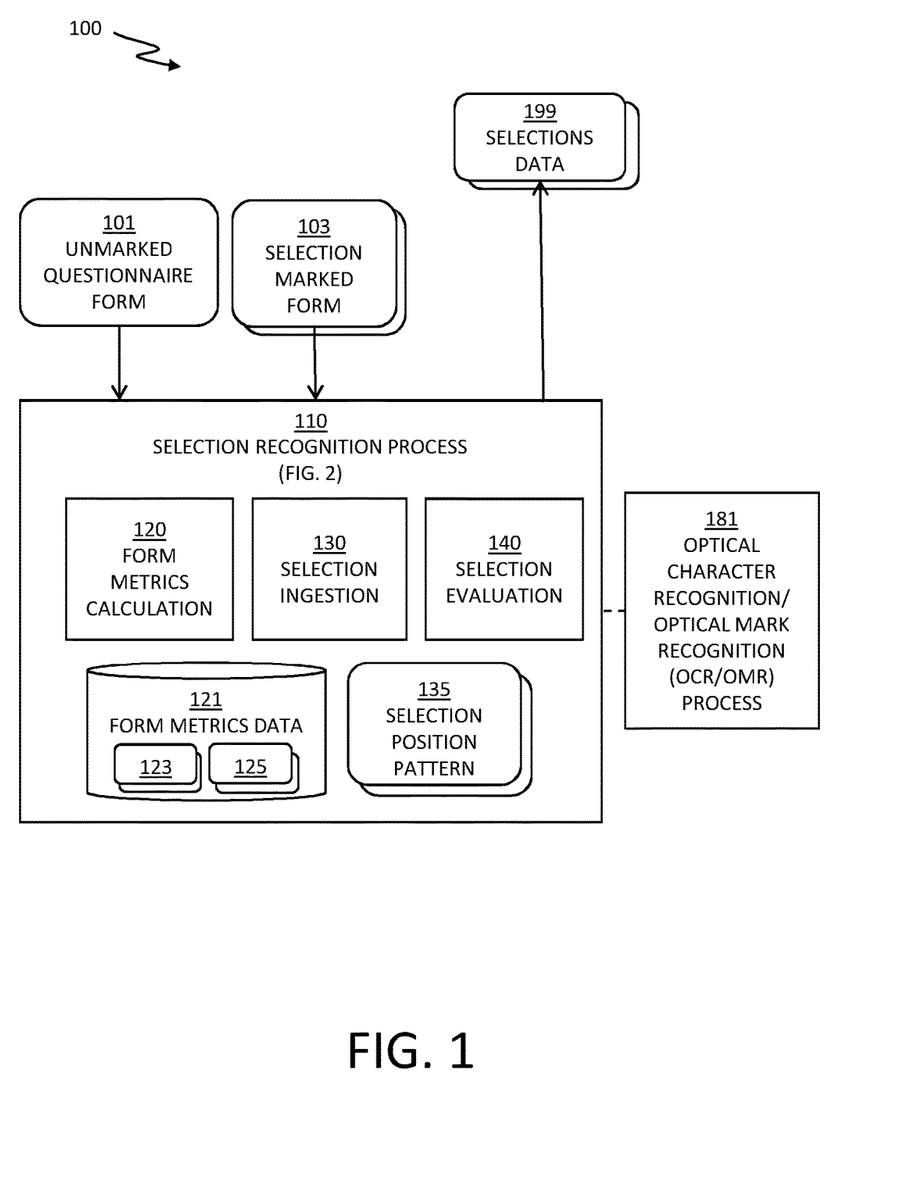
FIG. 1 depicts a system for automatically determining selections indicated by freehand marks on a questionnaire form, in accordance with one or more embodiments set forth herein.

FIG. 1 depicts a system 100 for automatically determining selections indicated by freehand marks on a questionnaire form, in accordance with one or more embodiments set forth herein.

The system 100 includes a unmarked questionnaire form 101, and one or more selection-marked form, and a selection recognition process 110. The unmarked questionnaire form 101 may include one or more questions and respective choices for the purpose of a survey, an exam, etc. The one or more selection marked form results from respondents marking the respective questionnaire forms to indicate the respective selection for the one or more question in the unmarked questionnaire form 101. The selection recognition process 110 takes the unmarked questionnaire form 101 and a selection marked form 103 of the one or more selection-marked form as inputs and produces selections data 199. The selection recognition process 110 may be coupled to an optical character recognition/optical mark recognition (OCR/OMR) process 181 and associated equipment and/or utilities in order to optically recognize texts and areas on the unmarked questionnaire form 101 and marks on the selection marked form 103. The selection recognition process 110 includes a form metrics calculation process 120, a selection ingestion process 130, and a selection evaluation process 140. The form metrics calculation process 120, the selection ingestion process 130, and the selection evaluation process 140 of the selection recognition process 110 represent respective functional elements, which may or may not be implemented as distinctive programs. Detailed operations of the selection recognition process 110 are presented in FIG. 2 and corresponding description.

The unmarked questionnaire form 101 includes one or more question and respective answer choice for each question of the one or more questions. The form metrics calculation process 120 of the selection recognition process 110 measures the unmarked questionnaire form 101 for answer areas for each questions and coordinates of respective choices in each question. The answer areas on the unmarked questionnaire form 101 are designated for freehand marks written in by the respondents in response to respective questions. As a result, the form metrics calculation process 120 stores the unmarked questionnaire form 101 as form metrics data 121 including an answer area 123 associated to a question, amongst the answer areas respective to each question, and a coordinates 125 of a choice for the question, amongst coordinates of the respective choices in each question. An exemplary questionnaire form 300 and associated form metrics data are presented in FIG. 3 and corresponding description.

The selection marked form 103 of the one or more selection-marked form is another form identical to the unmarked questionnaire form 101 having freehand marks written in by the respondents to indicate answer choices. In this specification, the term selections is used to represent collective answer choices selected for the respective question in the unmarked questionnaire form 101. Exemplary freehand marks and how to set center points of the exemplary freehand marks are presented in FIG. 3 and corresponding description.

The selection ingestion process 130 of the selection recognition process 110 takes the selection marked form 103 and generates the selection position pattern 135. The selection evaluation process 140 of the selection recognition process 110 takes the selection position pattern 135 and generates the selections data 199, which is digitized answer choices corresponding to the selection marked form 103. The selection recognition process 110 converts one or more selection position pattern respectively corresponding to the one or more selection marked form, and then generates one or more selections data corresponding to each of the one or more selection marked form. The selections data 199 may include answer choices for respective questions for all questions in the unmarked questionnaire form 101, which may be digitally processed for further counting and other statistical analysis.

With conventional OCR/OMR process and equipment, survey forms must be designed for optical scanning and digital processing, and respondents are requested to mark answer choices according to specific directions. If the survey forms are initially devised without digital processing in mind and the survey performed with such survey forms, conventional OCR/OMR process may not accurately extract answer choices from the survey forms that had been answered with freehand marks.

Figure 2:
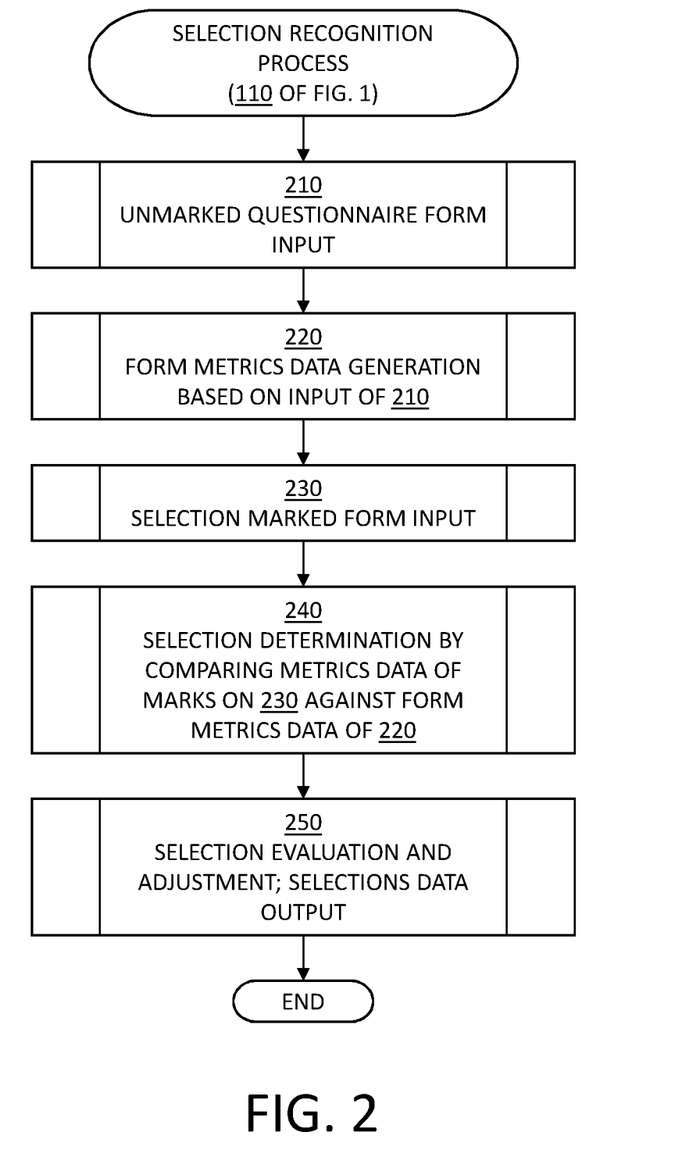
FIG. 2 depicts a flowchart of an overall process performed by the selection recognition process, in accordance with one or more embodiments set forth herein.

FIG. 2 depicts a flowchart of an overall process performed by the selection recognition process 110 of FIG. 1, in accordance with one or more embodiments set forth herein.

In block 210, the selection recognition process 110 obtains input of the unmarked questionnaire form by image scanning, etc. Then the selection recognition process 110 proceeds with block 220.

In certain embodiments of the present invention, the unmarked questionnaire form may have one or more question followed by two or more choices for each question. An exemplary questionnaire form 300 is shown in FIG. 3, having a first question 301 and two choices of YES and NO for the first question 301, and having a second question 302 and two choices YES and NO for the second question 302.

In block 220, the selection recognition process 110 generates form metrics data based on the unmarked questionnaire form input from block 210. In certain embodiments of the present invention, the form metrics data of the unmarked questionnaire form may include answer areas associated to each question and respective coordinates for each choice for a preceding question. Then the selection recognition process 110 proceeds with block 230.

Figure 3:
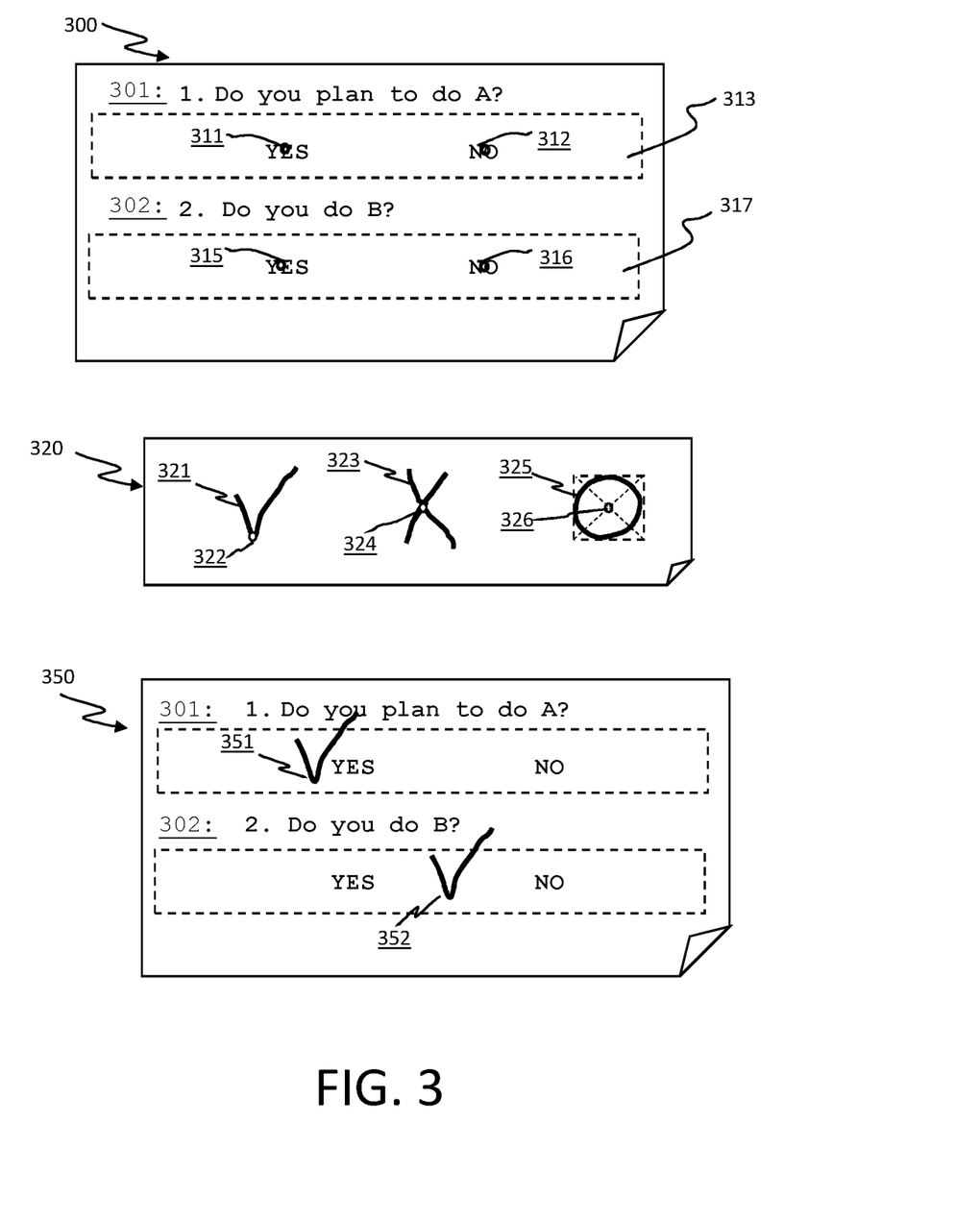
FIG. 3 depicts an exemplary unmarked questionnaire form, exemplary freehand marks that may appear on the selection marked form, and an exemplary selection marked form, in accordance with one or more embodiments set forth herein.

An exemplary unmarked questionnaire form 300 is shown in FIG. 3. In the exemplary questionnaire form 300 of FIG. 3, a first answer area 313 and other position data corresponding to a first question 301 would be stored in the form metrics data in block 220. Within the first answer area 313, a coordinates 311 corresponding to choice YES for the first question 301, and another coordinates 312 corresponding to choice NO for the first question 301 are set based on respective positions of the "YES", "NO" texts under the first question 301. The first answer area 313, answer coordinates 311, 312 including the YES coordinates of the first question 311, and the NO coordinates of the first question 312 may be stored as associated to the first question 301 within the form metrics data, by use of, among others, x-y coordinates, etc., to indicate six (6) points of reference in determining the answer choice for the first question 301 as in, for example, Q1:AnswerArea:upperLeft=$(x11,y11)$; Q1:AnswerArea:lowerLeft=$(x11,y12)$;
Q1:AnswerArea:lowerRight=$(x12,y12)$; Q1:AnswerArea:upperRight=$(x12,y11)$;
Q1:YesCoord=$(x15,y15)$; and Q1: NoCoord=$(x16,y16)$, wherein $x11<x15<x12$, $y11<y15<y12$, $x11<x16<x12$, and $y11<y16<y12$.

Similarly, in the same exemplary questionnaire form 300 of FIG. 3, a second answer area 317 and other position data corresponding to a second question 302 would be also stored in the form metrics data in block 220. Within the second answer area 317, a coordinates 315 corresponding to choice YES for the second question 302, and another coordinates 316 corresponding to choice NO for the second question 302 are set based on respective positions of the "YES", "NO" texts under the second question 302. The second answer area 317, answer coordinates 315, 316 including the YES coordinates of the second question 315, and the NO coordinates of the second question 316 may be stored as associated to the second question 302 within the form metrics data, by use of, among others, x-y coordinates, etc., to indicate six (6) points of reference in determining the answer choice for the second question 302 as in, for example, Q2:AnswerArea:upperLeft=$(x21,y21)$; Q2:AnswerArea:lowerLeft=$(x21,y22)$;
Q2:AnswerArea:lowerRight=$(x22,y22)$; Q2:AnswerArea:upperRight=$(x22,y21)$;
Q2:YesCoord=$(x25,y25)$; and Q2:NoCoord=$(x26,y26)$, wherein $x21<x25<x22$, $y21<y25<y22$, $x21<x26<x22$, and $y21<y26<y22$.

In block 230, the selection recognition process 110 obtains another input of the selection marked form, which has freehand marks written by respondents on the form identical to the unmarked questionnaire form from block 210. The selection recognition process 110 may configure a minimum dimension and/or other dimensional criteria for the freehand marks on the selection marked form such that a miniscule scribble or other unintentional marks on the form would not be accounted as the freehand marks selecting choices for the questions. Exemplary freehand marks 320 that may appear in the selection marked form from block 230 are shown in FIG. 3. The exemplary freehand marks 320 may include, but not limited to, a check mark (V) 321, a cross mark (X) 323, and a circular mark (O) 325 as shown. Then the selection recognition process 110 proceeds with block 240.

In block 240, the selection recognition process 110 determines the selections made by the freehand marks on the form obtained in block 230, by calculating metrics data of the freehand marks and subsequently comparing the freehand mark metrics data with the form metrics data created from block 220. Then the selection recognition process 110 proceeds with block 250.

In certain embodiments of the present invention, the selection recognition process 110 determines respective center points of the freehand marks. In the same exemplary freehand marks 320 of FIG. 3, the selection recognition process 110 may determine the center point of the check mark 322 corresponding to the check mark 321 as the position where the angle is made amongst the positions on the check mark 321. Similarly, the selection recognition process 110 may determine the center point of the cross mark 324 corresponding to the cross mark 323 as the position where two strokes intersect. The selection recognition process 110 may determine the center point of the circular mark 326 corresponding to the circular mark 325 as a geometric center of a rectangle encompassing the circular mark 325. The selection recognition process 110 then stores the freehand mark metrics data including a kind of mark of each freehand mark and the respective center points of the freehand marks appearing on the selection marked form input from block 230. Subsequently the selection recognition process 110 compares the freehand mark metrics data with the form metrics data previously prepared from block 220. For example, the freehand mark metrics data may be Q1:Mark=(V;x19, y19), indicating that a center point of a check mark (V) is positioned at (x19, y19) for the first question 301. In the same example as above, if the selection recognition process 110 discovers that x11<x19<x12 and y11<y19<y12, and a distance between (x15, y15) and (x19, y19), indicating the distance between the YES coordinates of the first question 311 and the mark for the first question, is less than a distance between (x16, y16) and (x19, y19), indicating the distance between the NO coordinates of the first question 312 and the mark for the first question, then the selection recognition process 110 determines that the selection for the first question 301 is YES. Subsequently the selection recognition process 110 may store the selection data as Q1:SelectionData=(V, YES, left) indicating that the first question was answered with a check mark "V" as "YES" on the left side of the YES choice for the first question, wherein the position may be selected from {above, below, left, right} to indicate the general direction of the center of the mark relative to the selected answer coordinate.

For another example, the freehand mark metrics data may be Q2:Mark=(O;x29, y29), indicating that a center point of a circular mark (O) is positioned at (x29, y29) for the second question 302. In the same example as above, if the selection recognition process 110 discovers that x21<x29<x22 and y21<y29<y22, and a distance between (x25, y25) and (x29, y29), that is the distance between the YES coordinates of the second question 315 and the mark for the second question, is greater than a distance between (x26, y26) and (x29, y29), that is the distance between the NO coordinates of the second question 316 and the mark for the second question, then the selection recognition process 110 determines that the selection for the second question 302 is NO. The distances between any freehand mark center point and the center points of answer choices such as YES and NO are respectively determined by Euclidean distance formula where $dist((x, y),(a, b))=\sqrt{(x-a)^2+(y-b)^2}$. Subsequently the selection recognition process 110 may store the selection data as Q2:SelectionData=(O, NO, below) indicating that the second question was answered with a circular mark "O" as "NO", and that the center of the circular mark is positioned below the coordinates of NO choice for the second question, wherein the position may be selected from {above, below, left, right} to indicate the general direction of the center of the mark relative to the selected answer coordinate.

In block 250, the selection recognition process 110 evaluates the selections for respective questions determined in block 240 and may adjust the respective selections by use of a preconfigured rules and/or thresholds. In cases where the unmarked questionnaire form does not inform the respondents as to how to mark the questionnaire forms and/or the respondents had marked them rather freely without following certain marking directions, the freehand marks on the selection marked forms may be ambiguous, which may be reasonably determined to be selecting one answer choice or the other for a question. The selection recognition process 110 evaluates the selections determined in block 240 and adjusts selections for ambiguous marks according to a marking pattern of the present form such that the adjusted selections may resemble actual selections more closely than the selections based only on distances between reference points from block 240. Subsequent to evaluating the selections, the selection recognition process 110 produces the selection data representing selections from the input of block 230. Then the selection recognition process 110 concludes processing the selection marked form input at block 230. The selection recognition process 110 may repeat blocks 230 through 250 for each selection marked form and produce the selection data respectively. The selection data produced by the selection recognition process 110 may be input to a statistics analysis process for further processing.

In certain embodiments of the present invention, the selection recognition process 110 in block 250 may evaluate the selections by a pattern in the positions of the freehand marks. For example, if all unambiguous marks appear in front of the choices, which is represented as consistent "left" position for the freehand marks, the selection recognition process 110 may account an ambiguous mark between two choices as a selection for a latter choice based on that the respondent had marked the questionnaire form consistently as other marks, in front of the latter choice. In this specification, an ambiguous mark has the center point of the mark at approximately comparable distances from two or more answer choices of a question. In the same example, the selection recognition process 110 may apply a distance threshold in determining ambiguity of a mark such that the mark should not be deemed ambiguous if the mark is within the distance threshold from one answer choice, and consequently would not adjust the selection data regardless of a marking pattern. The distance threshold may be set relative to the distance to other answer choice such that if a mark is closer to one choice than the other choice by fifty percent (50%), then the selection recognition process 110 would not adjust the selection data based on the marking pattern.

In certain embodiments of the present invention, the selection recognition process 110 may evaluate the selections by use of the mark types. For example, if both a circular mark and a cross mark appear on distinctive positions within single answer area for a question, the selection recognition process 110 may account a choice close to the center point of the circular mark as a selection for the question based on that the respondent had marked the cross mark to negate a choice close to the cross mark while put the circular mark to affirm the choice close to the circular mark for other questions.

FIG. 3 depicts an exemplary unmarked questionnaire form 300, exemplary freehand marks 320 that may appear on the selection marked form 103 of FIG. 1, and an exemplary selection marked form 350, in accordance with one or more embodiments set forth herein.

Detailed description of the exemplary unmarked questionnaire form 300 is presented in blocks 210 and 220 of FIG. 2 description above. Detailed description and processing of the exemplary freehand marks 320 are presented in blocks 230 and 250 of FIG. 2 above.

The exemplary selection marked form 350 depicts check marks 351, 352 respectively written in for the first question 301 and the second question 302, on a form identical to the exemplary unmarked questionnaire form 300 shown above. Because a first check mark 351 for the first question 301 is distinctively closer to the choice YES than to the choice NO, the first check mark 351 is unambiguous and would not be adjusted according to positional pattern of freehand marks on the exemplary selection marked form 350. A second check mark 352 is placed between the choice YES and the choice NO, and the distance between the second check mark 352 and the choice YES is approximately the same as the distance between the second check mark 352 and the choice NO. Accordingly, the selection recognition process 110 would determine the second check mark 352 as ambiguous and adjust the selection data for the second question 302 by use of a positional pattern of the rest of freehand marks on the selection data form. If the selection recognition process 110 first determines selection data for the second question 302 as YES as the distance between the second check mark 352 and the choice YES is shorter than the distance between the second check mark 352 and the choice NO by five percent (5%), then the selection recognition process 110 would adjust the selection data for the second question 302 to NO, based on that unambiguous mark selecting the choice YES for the first question 301 is positioned on the left of the choice, and the second check mark 352 may be consistently counted as selecting the choice NO by the second check mark 352 on the left of the choice NO.

Certain embodiments of the present invention may offer various technical computing advantages, including data extraction from freehand marks on a questionnaire form and evaluation of the extracted data based on categories including a pattern of the freehand marks. The questionnaire form is processed and form metrics data is generated based on the questionnaire form, and answered forms with the freehand marks are processed to generate metrics data of the freehand marks. The metrics data of the freehand marks are checked against the form metrics data to produce selections data. Certain embodiments of the present invention may be implemented as a subscribed service to offer automated data extraction on surveys not designed for digital processing. Certain embodiments of the present invention improves the accuracy of the extracted selections data by automatically evaluating the selections data and by automatically adjusting answer choices marked ambiguous freehand marks based on positional consistency, and as a result also improves cost-effectiveness in data extraction in similar cases.

Figure 4:
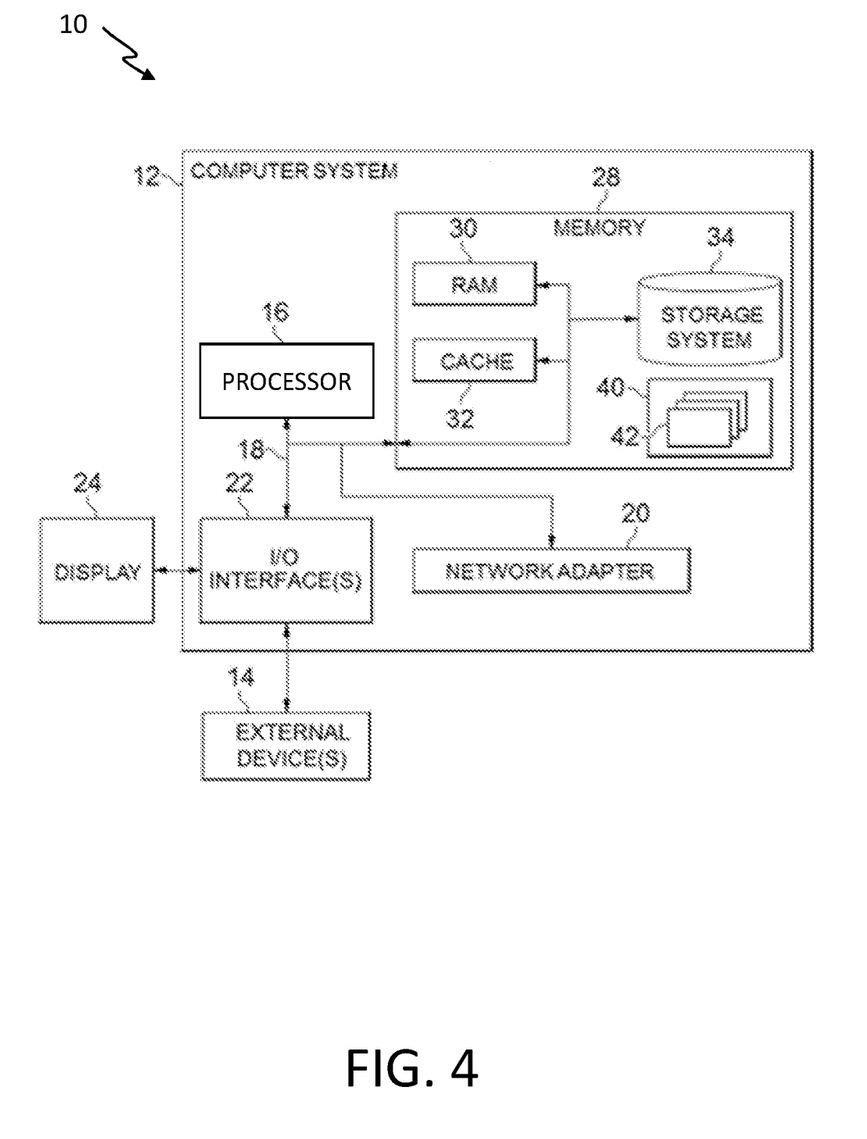
FIG. 4 depicts a cloud computing node according to an embodiment of the present invention.
Figure 5:
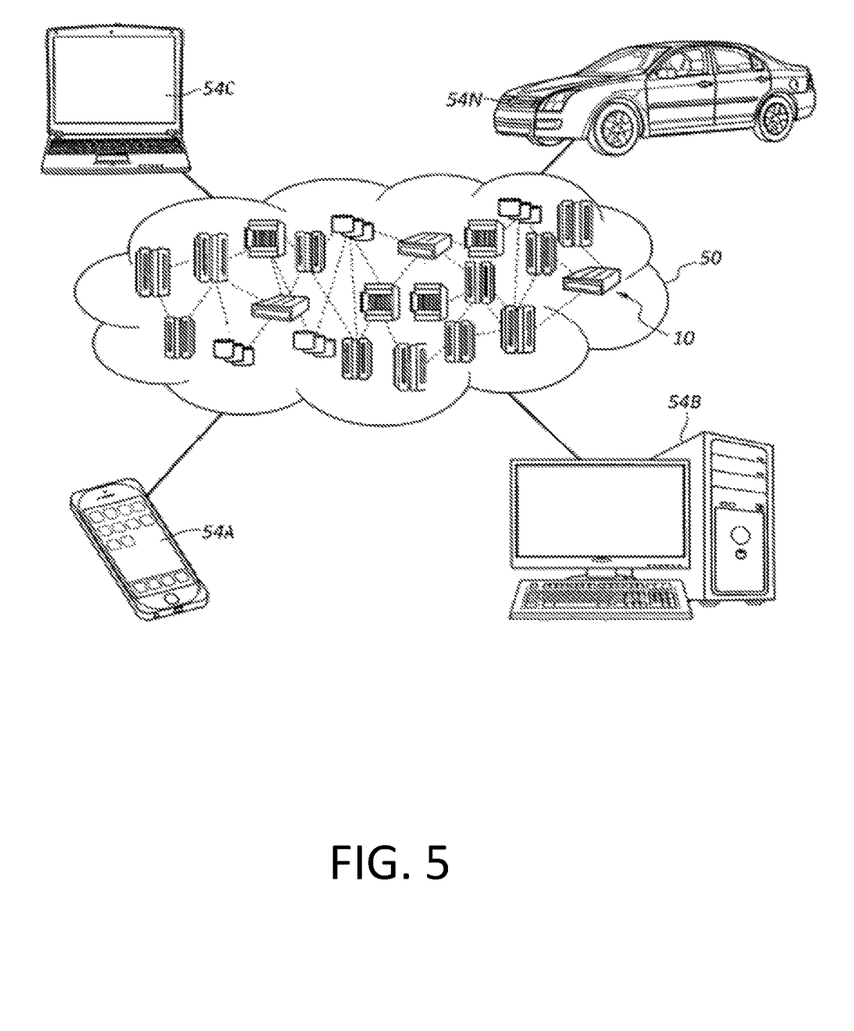
FIG. 5 depicts a cloud computing environment according to an embodiment of the present invention.
Figure 6:
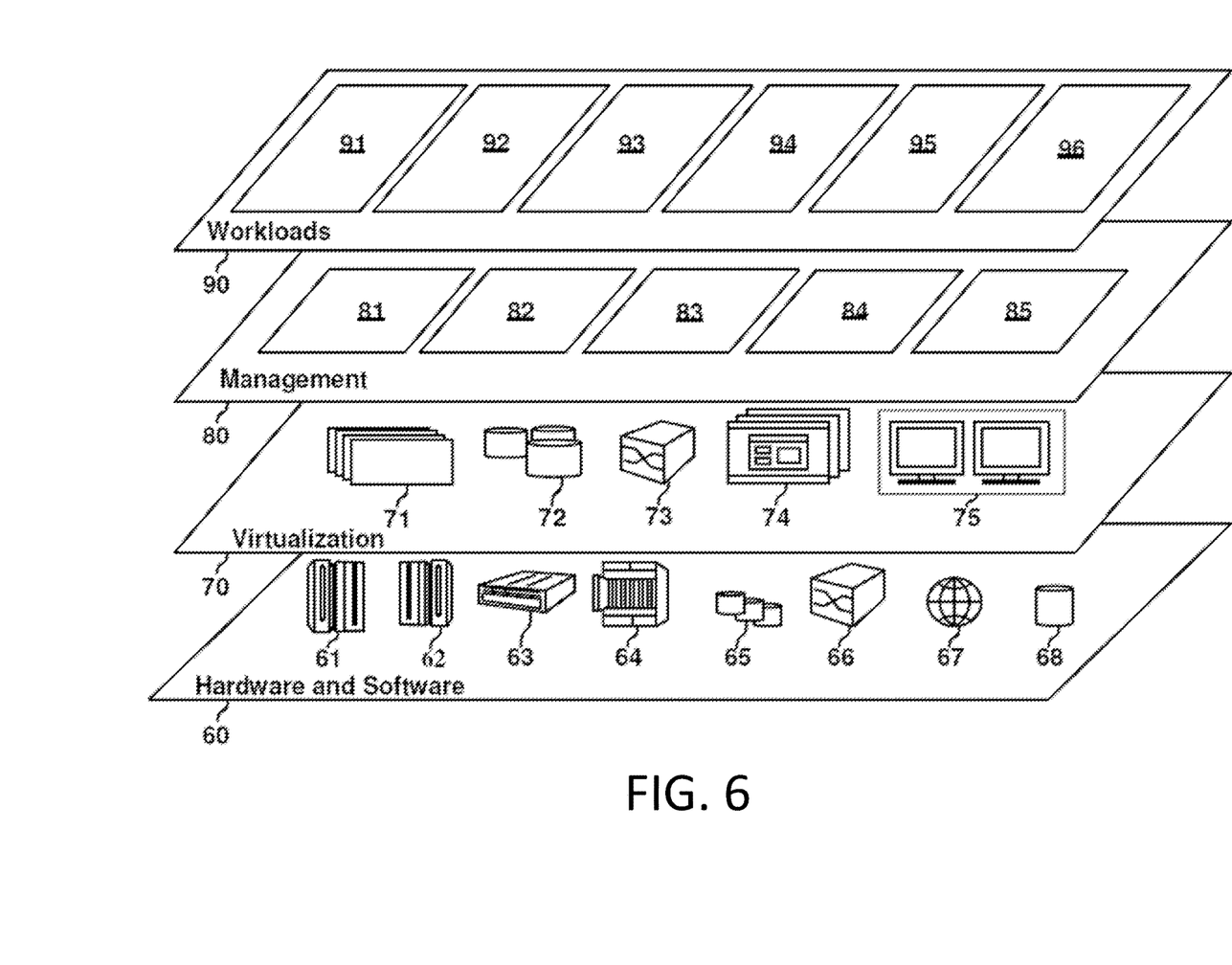
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the selection recognition process 110 of FIG. 1. Program processes 42, as in the selection recognition process 110 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 running the selection recognition process 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the selection recognition process 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for automatically determining selections data from a selection marked form, comprising:

obtaining, by one or more processor from an input device, an unmarked questionnaire form, wherein the unmarked questionnaire form is identical to the selection marked form without freehand marks;

creating form metrics data of the unmarked questionnaire form, wherein the unmarked questionnaire form includes one or more question and two or more answer choices for respective question of the one or more question;

receiving the selection marked form as an input, wherein the freehand marks had been manually written on the selection marked form by a respondent answering the respective question in the unmarked questionnaire form;

determining the selections data based on the freehand marks on the selection marked form, wherein the selections data represents respective selection amongst the two or more answer choices for the respective question;

adjusting the determined selections data for one or more ambiguous mark according to a pattern of the freehand marks; and producing the adjusted selections data such that the selections data is provided for a statistical analysis.

2. The computer implemented method of claim 1, the creating comprising:

calculating answer area coordinates bounding an answer area for a question of the one or more question;

calculating answer choice coordinates corresponding to respective answer choice of the two or more answer choices for the question; and recording, for the question, the answer area coordinates associated with the question, and the answer choice coordinates the question.

3. The computer implemented method of claim 2, the determining comprising:

distinguishing a freehand mark of the freehand marks on the selection marked form from the unmarked questionnaire form;

calculating a center point of the freehand mark;

ascertaining that the center point is located within the answer area for the question;

discovering that a first distance between the center point and first coordinates of a first answer choice for the question is the shortest amongst all distances between the center point and respective coordinates of the respective answer choice for the question; and assigning the first answer choice to selection data for the question.

4. The computer implemented method of claim 3, the adjusting comprising:

discovering that the freehand mark is ambiguous responsive to ascertaining that the first distance and a second distance are significantly similar, wherein the second distance is between the center point and second coordinates of a second answer choice for the question;

discovering that the center point is located in a first position relative to the first answer choice, that the first position is inconsistent with other center points for respective freehand marks for other questions on the selection marked form, that the center point is located in a second position relative to the second answer choice, and that the second position is consistent with the other center points for respective freehand marks on the selection marked form; and updating the selection data for the question with the second answer choice.

5. The computer implemented method of claim 4, wherein the first distance and the second distance are significantly similar in case where the difference between the first distance and the second distance is less than a distance threshold.

6. The computer implemented method of claim 3, the adjusting comprising:

discovering that the freehand mark is unambiguous responsive to ascertaining that the first distance and a second distance are visibly different, wherein the second distance is between the center point and second coordinates of a second answer choice for the question; and affirming the first answer choice as the selection data for the question.

7. The computer implemented method of claim 6, wherein the first distance and the second distance are visibly different in case where the difference between the first distance and the second distance is greater than or equal to a distance threshold.

8. A computer program product comprising:

a computer readable storage medium readable by one or more processor and storing instructions for execution by the one or more processor for performing a method for automatically determining selections data from a selection marked form, comprising:

obtaining an unmarked questionnaire form, wherein the unmarked questionnaire form is identical to the selection marked form without freehand marks;

creating form metrics data of the unmarked questionnaire form, wherein the unmarked questionnaire form includes one or more question and two or more answer choices for respective question of the one or more question;

receiving the selection marked form as an input, wherein the freehand marks had been manually written on the selection marked form by a respondent answering the respective question in the unmarked questionnaire form;

determining the selections data based on the freehand marks on the selection marked form, wherein the selections data represents respective selection amongst the two or more answer choices for the respective question;

adjusting the determined selections data for one or more ambiguous mark according to a pattern of the freehand marks; and producing the adjusted selections data such that the selections data is provided for a statistical analysis.

9. The computer program product of claim 8, the creating comprising:

calculating answer area coordinates bounding an answer area for a question of the one or more question;

calculating answer choice coordinates corresponding to respective answer choice of the two or more answer choices for the question; and recording, for the question, the answer area coordinates associated with the question, and the answer choice coordinates the question.

10. The computer program product of claim 9, the determining comprising:

distinguishing a freehand mark of the freehand marks on the selection marked form from the unmarked questionnaire form;

calculating a center point of the freehand mark;

ascertaining that the center point is located within the answer area for the question;

discovering that a first distance between the center point and first coordinates of a first answer choice for the question is the shortest amongst all distances between the center point and respective coordinates of the respective answer choice for the question; and assigning the first answer choice to selection data for the question.

11. The computer program product of claim 10, the adjusting comprising:

discovering that the freehand mark is ambiguous responsive to ascertaining that the first distance and a second distance are significantly similar, wherein the second distance is between the center point and second coordinates of a second answer choice for the question;

discovering that the center point is located in a first position relative to the first answer choice, that the first position is inconsistent with other center points for respective freehand marks for other questions on the selection marked form, that the center point is located in a second position relative to the second answer choice, and that the second position is consistent with the other center points for respective freehand marks on the selection marked form; and updating the selection data for the question with the second answer choice.

12. The computer program product of claim 11, wherein the first distance and the second distance are significantly similar in case where the difference between the first distance and the second distance is less than a distance threshold.

13. The computer program product of claim 10, the adjusting comprising:

discovering that the freehand mark is unambiguous responsive to ascertaining that the first distance and a second distance are visibly different, wherein the second distance is between the center point and second coordinates of a second answer choice for the question; and affirming the first answer choice as the selection data for the question.

14. The computer program product of claim 13, wherein the first distance and the second distance are visibly different in case where the difference between the first distance and the second distance is greater than or equal to a distance threshold.

15. A system comprising:

a memory;

one or more processor in communication with memory; and program instructions executable by the one or more processor via the memory to perform a method for automatically determining selections data from a selection marked form, comprising:

obtaining an unmarked questionnaire form, wherein the unmarked questionnaire form is identical to the selection marked form without freehand marks;

creating form metrics data of the unmarked questionnaire form, wherein the unmarked questionnaire form includes one or more question and two or more answer choices for respective question of the one or more question;

receiving the selection marked form as an input, wherein the freehand marks had been manually written on the selection marked form by a respondent answering the respective question in the unmarked questionnaire form;

determining the selections data based on the freehand marks on the selection marked form, wherein the selections data represents respective selection amongst the two or more answer choices for the respective question;

adjusting the determined selections data for one or more ambiguous mark according to a pattern of the freehand marks; and producing the adjusted selections data such that the selections data may be utilized for a statistical analysis.

16. The system of claim 15, the creating comprising:

calculating answer area coordinates bounding an answer area for a question of the one or more question;

calculating answer choice coordinates corresponding to respective answer choice of the two or more answer choices for the question; and recording, for the question, the answer area coordinates associated with the question, and the answer choice coordinates the question.

17. The system of claim 16, the determining comprising:

distinguishing a freehand mark of the freehand marks on the selection marked form from the unmarked questionnaire form;

calculating a center point of the freehand mark;

ascertaining that the center point is located within the answer area for the question;

discovering that a first distance between the center point and first coordinates of a first answer choice for the question is the shortest amongst all distances between the center point and respective coordinates of the respective answer choice for the question; and assigning the first answer choice to selection data for the question.

18. The system of claim 17, the adjusting comprising:

discovering that the freehand mark is ambiguous responsive to ascertaining that the first distance and a second distance are significantly similar, wherein the second distance is between the center point and second coordinates of a second answer choice for the question;

discovering that the center point is located in a first position relative to the first answer choice, that the first position is inconsistent with other center points for respective freehand marks for other questions on the selection marked form, that the center point is located in a second position relative to the second answer choice, and that the second position is consistent with the other center points for respective freehand marks on the selection marked form; and updating the selection data for the question with the second answer choice.

19. The system of claim 18, wherein the first distance and the second distance are significantly similar in case where the difference between the first distance and the second distance is less than a distance threshold.

20. The system of claim 17, the adjusting comprising:

discovering that the freehand mark is unambiguous responsive to ascertaining that the first distance and a second distance are visibly different, wherein the second distance is between the center point and second coordinates of a second answer choice for the question, and wherein the first distance and the second distance are visibly different in case where the difference between the first distance and the second distance is greater than or equal to a distance threshold; and affirming the first answer choice as the selection data for the question.

* * * * *